United States Patent [19]
Covell, III et al.

[11] Patent Number: 5,232,394
[45] Date of Patent: Aug. 3, 1993

[54] POULTRY SCALDER

[76] Inventors: Edward H. Covell, III, 919 Riverside Dr., Salisbury, Md. 21801; Eugene Martin, 840 S. Cocalico Rd., Denver, Pa. 17517

[21] Appl. No.: 880,404

[22] Filed: May 8, 1992

Related U.S. Application Data

[63] Continuation-in-part of Ser. No. 822,061, Jan. 21, 1992, Pat. No. 5,190,494.

[51] Int. Cl.$^5$ ............................................. A22C 21/04
[52] U.S. Cl. ...................................... 452/78; 452/74; 452/80
[58] Field of Search .................. 452/78, 74, 75, 76, 452/77, 79, 80

[56] References Cited

U.S. PATENT DOCUMENTS

| | | | |
|---|---|---|---|
| 1,668,039 | 5/1928 | Allen | 17/47 |
| 1,672,555 | 6/1928 | Barker et al. | 17/45 |
| 2,412,338 | 12/1946 | Jasper | 17/45 |
| 2,732,583 | 1/1956 | Van Dolah | 17/11.2 |
| 2,810,927 | 10/1957 | Adams et al. | 17/11.2 |
| 2,879,540 | 3/1959 | Van Ness | 17/11.2 |
| 3,094,740 | 6/1963 | Reeves | 452/78 |
| 3,103,697 | 9/1963 | Almquist | 17/45 |
| 3,748,691 | 7/1973 | Snowden | 17/11.2 |
| 4,566,151 | 1/1986 | Warren | 17/47 |
| 4,852,215 | 8/1989 | Covell, III | 17/112 |
| 4,944,068 | 7/1990 | Covell, III | 17/11.2 |
| 4,947,518 | 8/1990 | Covell, III | 17/11.2 |
| 4,996,741 | 3/1991 | Covell, III | 452/74 |

FOREIGN PATENT DOCUMENTS 8800549 10/1989 Netherlands ........................... 452/78

*Primary Examiner*—Willis Little
*Attorney, Agent, or Firm*—Shoemaker and Mattare, Ltd.

[57] ABSTRACT

A poultry scalding tank has one wall with a lateral pocket that receives the breast of the bird suspended by the feet from a shackle conveyor running above the tank. The top of the pocket produces a force normal to the breast upon contact, which force has a downward component sufficient to overcome buoyancy forces that tend to raise portions of the bird out of the water. Air injector heads disposed below the path of the bird, and offset away from the breast side thereof, agitate the scalding water to penetrate the feathers. A more thorough and even scalding results.

3 Claims, 2 Drawing Sheets

POULTRY SCALDER

This application is a continuation-in-part of application Ser. No. 07/822,961, filed Jan. 21, 1992, now U.S. Pat. No. 5,190,494.

BACKGROUND OF THE INVENTION

This invention relates to butchering, particularly to an apparatus for scalding poultry.

After a chicken or other bird is slaughtered in a processing plant, it is carried by a leg shackle conveyor through a scalding bath, containing water at a temperature of about 128° F. to 140° F., to loosen the feathers prior to plucking. The immersion time is kept to the minimum necessary to loosen all the feathers, so as not to cook the outer layers of the bird, which can alter its color, among other effects. However, the feathers and anatomical irregularities both interfere with water flow around the bird and hence heat transfer, so that non-uniform scalding results. Two problem areas are around the tail, and the backs of the wings. To loosen the feathers sufficiently in the most difficult areas, it is necessary to keep the bird in the bath longer than is necessary for the better exposed areas.

When a bird is scalded, heat is transferred to the skin and feather follicles. Heat transfer rates are reduced by the feathers themselves, which are good insulators. Feathers track differently on different parts of the body. At some parts, for example the breast, feathers are easily penetrated by the scalding water, while at other locations, they are more difficult to penetrate. To get even scalding, it is necessary to enhance heat transfer at the difficult areas, e.g., the tail.

In an effort to improve heat transfer, and thus reduce scalding time, it is common to agitate the water around the bird, for example by injecting hot air into the scalding tank below the conveyor line. One example of this technique is described in U.S. Pat. No. 4,566,151.

In any scalding bath, a bird's buoyancy tends to bring it to the surface, so that part of the bird (for example, the problematic tail area) may be out of contact with the hot water. Air injection aggravates the buoyancy problem.

Whenever buoyancy causes incomplete scalding, rejection of the bird, or extensive hand picking, may follow. therefore, the buoyancy problem has been addressed previously, in a number of ways, including: (a) using a low-density scalding fluid like steam or hot air; (b) using water sprays instead of immersion—see, e.g., U.S. Pat. No. 2,412,338; (c) generating localized downward currents in a water bath sufficient to overcome buoyancy—U.S. Pat. No. 3,879,540; and (d) providing some sort of mechanical restrain above the bird. Mechanical devices previously used include rails at the surface of the bath, between which the feet of the bird pass. One such use is shown in U.S. Pat. No. 3,103,697. Techniques (c) and (d) are combined in U.S. Pat. No. 1,672,555.

A problem with physical restraints is that they generally constitute separate parts adding to the cost of the tank and requiring additional cleaning and service; they also obstruct service access to the inside of the tank. Furthermore, physical restraints above the tank provide an unnecessary opportunity for obstructing conveyors and other automated equipment. For these reasons, it would be preferable to have a scalding tank whose top was completely open, free of any obstruction.

Another problem, which arises in air-agitated scalding tanks, is that of flow interference. Each air injection head or diffuser forms a plume of bubbles which generate local water updrafts in the bath, above the diffusers, and local downdrafts between the diffusers. The plumes and drafts interfere with water flow along the length of the tank. To compensate for the increased flow resistance, a greater pressure gradient must be applied, resulting in large water level differences, from one end of the bath to another. These differences may be unacceptable, particularly if the bath is a long one.

We have found that, by raising the diffuser head substantially above the bottom of the bath, we can reduce plume-generated resistance to flow along the bottom of the tank.

SUMMARY OF THE INVENTION

An object of this invention is to prevent birds from floating up in a scalding bath, that is, to keep their feathered portions fully submerged, without obstructing the top of the bath with a physical barrier.

Related objects are to reduce reject rates, to minimize tedious hand picking, and to shorten the scalding time.

A further object is to simplify the design of a scalding tank, so as to reduce its construction and maintenance costs.

Another object of the invention is to reduce the resistance to lengthwise water flow in a tank, caused by air bubble generated vertical water currents.

These and other objects of the invention are met by a scalding tank in the form of an elongate channel, one side wall of which does not contact birds passed through the tank; the other side is contoured to engage the breast of each bird from above, so as to keep the bird fully submerged. The contour of the working side wall also is designed to provide clearance for the leg. The conveyor plane is offset toward the working side wall, to create the necessary breast contact with the contoured wall, and to keep the breast away from the area of maximum bubble agitation. Water is agitated by a series of air diffuser heads which are disposed at intervals along the length of the tank and raised substantially above the bottom of the tank, to reduce water flow resistance.

BRIEF DESCRIPTION OF THE DRAWINGS

In the accompanying drawings.

DESCRIPTION OF THE PREFERRED EMBODIMENT

Figure 1:
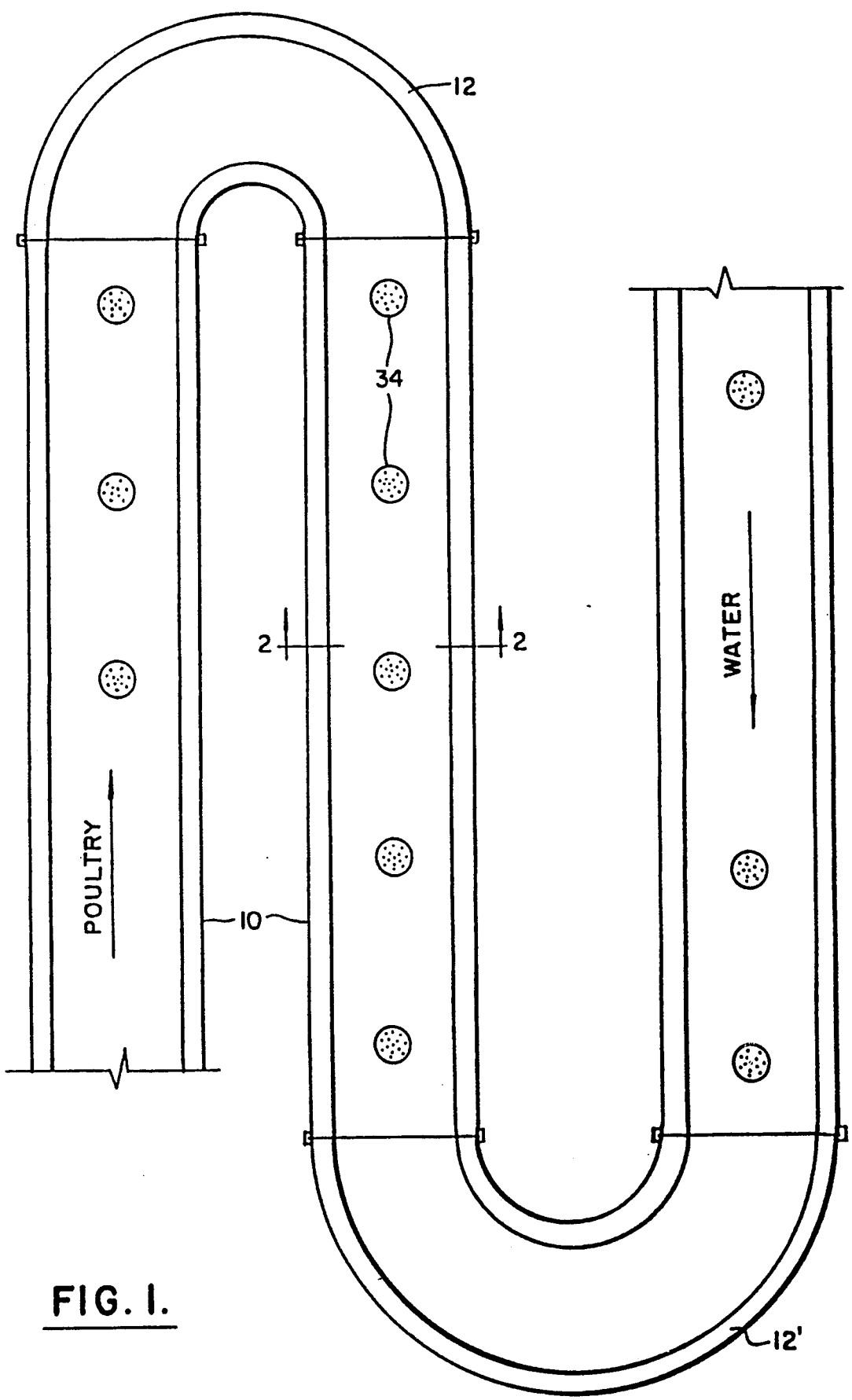
FIG. 1 is a top plan view of a scalding tank constructed according to the invention.

As shown in FIG. 1, a scalding tank constructed according to the invention comprises a plurality of straight troughs or channels 10, interconnected by arcuate channel sections 12, 12' in a serpentine arrangement. The particular geometry of the serpentine path is not important to this invention, and in fact a path of any shape can be used. The geometry chosen will usually depend on plant layout. The difference between the arcuate sections indicated by numeral 12 and those by 12' is that the former have a smaller radius of curvature.

This results from the asymmetrical cross-sectional trough shape shown in the drawings and described below.

Figure 2:
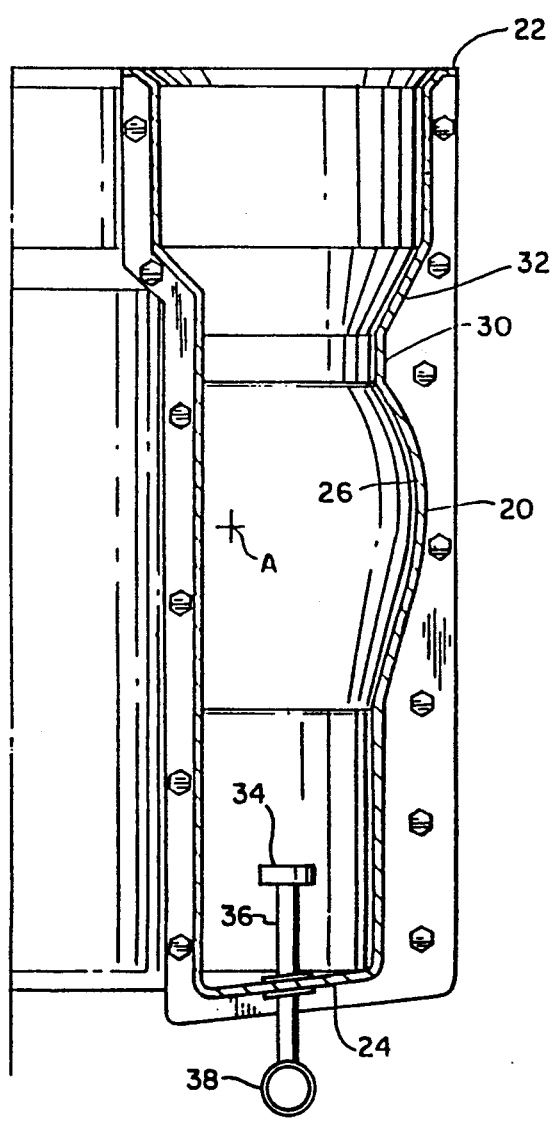
FIG. 2 is a sectional view of the invention, taken along the vertical plane 2—2 in FIG. 1, showing part of a curved section in the background.
Figure 3:
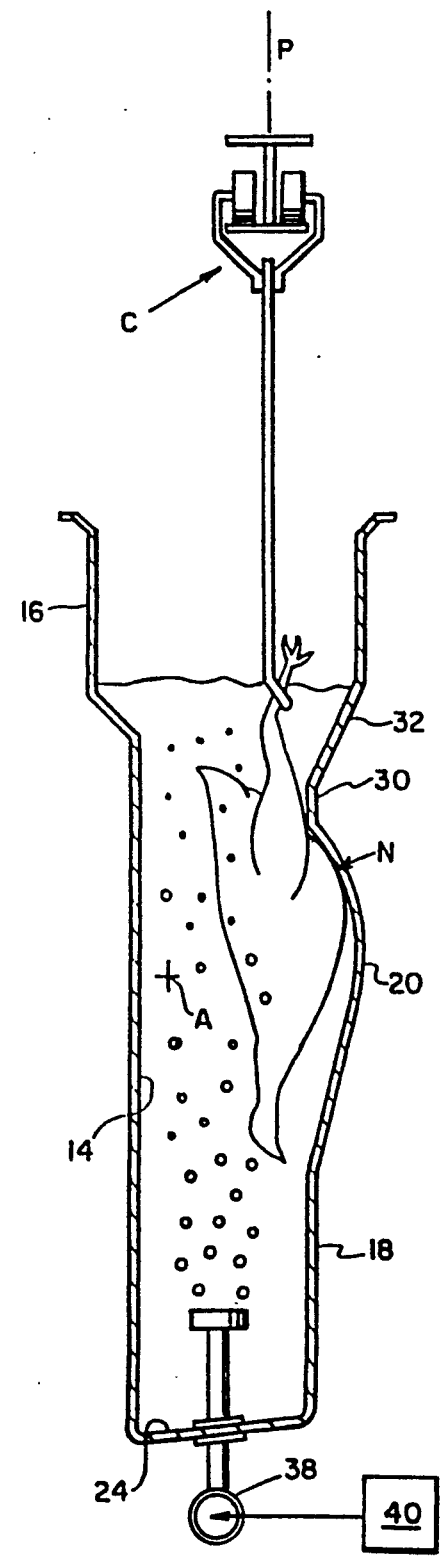
FIG. 3 is a view similar to FIG. 2, but with background removed for clarity, showing also a conveyor supporting a chicken and its relationship to the tank.

The trough has a substantially uniform cross-section over its entire length. A representative cross-section is illustrated in FIGS. 2 and 3. As evident from FIG. 3, each trough is offset or shifted laterally in one direction with respect to the center plane P of the shackle conveyor C above it. The bird does not contact the "far" side wall 14 more remote from the plane P; hence, that wall is substantially vertical and smooth, except for the offset portion 16 near the top, which is provided only to improve the strength of the trough. Additional ribs or other reinforcement may be provided if necessary.

The "near" side wall 18 of the trough is not planar; rather, it is characterized by an outward bulge 20 intermediate the top 22 and bottom 24 of the trough, forming a pocket 26 at a level corresponding to the breast of the bird. In practice, one can raise or lower the tank, or the conveyor, to establish proper registration between the breast location and the pocket. The tank may be provided with feet, not shown, to provide for such adjustment.

The inner surface of the pocket 26 is preferably a segment of a cylindrical surface whose axis A extends horizontally through the tank. In the tank presently preferred for scalding chickens, the axis A is about 19.25 inches from the top of the tank, and the pocket has an inside radius of about 7.875 inches. At least a portion of the pocket lies higher than its axis A; it is that portion of the pocket above the axis which, sloping upwardly and inwardly, performs the funcion of keeping the bird down in the scalding tank. As the shackle conveyor keeps the breast in contact with this segment, there is a resulting normal force N impressed upon the bird, which has a downward component sufficient to overcome the buoyancy of the bird in the bath.

The pocket 26 is bounded immediately above by a short vertical wall segment 30 that runs parallel to the legs of the bird; an oblique segment 32, above the segment 30, opens outwardly toward the top of the tank, to clear the bird's feet and avoid any interference at that point.

The floor 24 of the tank is tilted to one side, as shown, to prevent pooling of water when the tank is emptied for cleaning.

Above the floor 24 of the trough, there are a series of longitudinally spaced air injector heads 34, one of which is shown in FIG. 3. The heads are stock items available from FMC Corp. under the mark "Discfuser". Each injector emits a plume of bubbles that rise around the bird, creating both a local updraft of water, and local turbulence which penetrates the feather layer and produces more uniform heat transfer.

Each of the air injector heads 34 is situated at the top of a riser 36, the upper surface of the injector being about eight to nine inches above the floor 24, just below the heads of the birds. The heads well above the floor of the tank—at least six inches—without acutally being in the path of the birds. The risers 36 are connected to a common conduit 38 fed by a source of compressed air, represented diagrammatically at 40.

In operation, a series of birds are loaded into the shackle conveyor so that the birds are aligned the same way, in FIG. 3. The conveyor is moved continuously and at constant speed by a suitable drive mechanism, not shown, carrying the birds along the length of the scalding tank. Hot water introduced into the downstream end of the tank flows toward an outlet at the upstream end. The resulting counterflow applies the hottest, cleanest water to each bird just before it exits from the bath.

Beneath the birds, for all or part of the length of the trough, the air injectors agitate the scalding water to improve heat transfer. The breast of each bird remains engaged by the upper portion of the pocket 26, keeping the bird down in the water so that all portions, especially the tail, remain in contact with the water. Because the conveyor plane is offset from that of the air injectors, the breasts are not directly above the air injectors, and in fact are rather protected from agitation by the pocket 26. As each bird passes over one of the air injectors, it experiences an upward current of water and air bubbles, passing primarily over the shoulder area, back, sides and tail, which help penetrate the feathers in those difficult areas. Additionally, the updraft, most of which is on the back side of the bird, tends to force the bird further into the pocket.

When the bird passes through the area between injectors, the local downward currents penetrate particularly feathers having an upward lie, such as those at the tail.

As a result, full scalding of each bird is achieved. while avoiding local overscalding, and without the costs, dangers or inconvenience of prior mechanical restraints used to prevent birds form floating in a scalding tank.

It should be understood that the particular geometry and dimensions described above for the pocket are only those presently preferred, and are presented as the best mode now contemplated for carrying out this invention. It is expected that variations on this geometry may prove workable, or even superior. What is important is that the portion of the near wall in contact with the birds' breasts face the birds obliquely downward. The pocket need not necessarily be a cylindrical segment. It could have another curved shape, or might be formed from straight segments. The shape proposed is more easily cleaned that would be one with sharp corners.

Inasmuch as the invention is subject to many modifications and variations, it is intended that the foregoing shall be interpreted as merely illustrative of the invention defined by the following claims.

I claim:

1. An apparatus for scalding poultry, comprising
   a shackle conveyor for moving a series of slaughtered birds along a predetermined path,
   an elongate tank for containing scalding water, disposed below said conveyor and configured to follow said path, said tank having a floor, an open top, and two side walls, at least one of said walls having an inwardly and upwardly inclined portion level with the breasts of the birds, and
   said conveyor being situated sufficiently close to said inwardly inclined wall portion, laterally, to keep the breasts in contact therewith, whereby a normal force developed between said inwardly inclined wall portion and the breast has a downward component sufficient to overcome any buoyancy that would otherwise raise portions of the birds out of the water and
   further comprising a series of air injectors disposed at intervals along the length of the tank, each injector comprising a head disposed a substantial distance above the tank floor, to avoid bubble-generated interference with water flow along the bottom of the tank.

2. The invention of claim 1, wherein each of said air injector heads is at least six inches above the tank floor.

3. The invention of claim 1, wherein each of said injector heads is in the range of eight to nine inches above the tank floor.

* * * * *